United States Patent
D'Aluisio et al.

(10) Patent No.: US 10,919,592 B2
(45) Date of Patent: Feb. 16, 2021

(54) BICYCLE WITH COMPLIANT SEAT POST INTERFACE

(71) Applicant: Specialized Bicycle Components, Inc., Morgan Hill, CA (US)

(72) Inventors: Christopher P. D'Aluisio, Corralitos, CA (US); Brenton Haven, Morgan Hill, CA (US); Ian Milliken, Morgan Hill, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 243 days.

(21) Appl. No.: 15/947,584

(22) Filed: Apr. 6, 2018

(65) Prior Publication Data

US 2019/0308680 A1 Oct. 10, 2019

(51) Int. Cl.
*B62J 1/02* (2006.01)
*B62K 19/36* (2006.01)
*B62K 3/04* (2006.01)

(52) U.S. Cl.
CPC ............... *B62J 1/02* (2013.01); *B62K 19/36* (2013.01); *B62K 3/04* (2013.01); *B62K 2201/08* (2013.01)

(58) Field of Classification Search
CPC ... B62J 1/02; B62K 19/36; B62K 3/04; B62K 2201/08
See application file for complete search history.

(56) References Cited

U.S. PATENT DOCUMENTS

| 5,236,169 | A | * | 8/1993 | Johnsen | .................... B62J 1/06 248/561 |
| 7,125,030 | B2 | | 10/2006 | D'Aluisio et al. | |
| 8,857,841 | B2 | | 10/2014 | Lund et al. | |
| 9,278,724 | B2 | | 3/2016 | Lund et al. | |

(Continued)

FOREIGN PATENT DOCUMENTS

| EP | 2052957 A2 | 4/2009 |
| EP | 2474465 A1 | 7/2012 |

(Continued)

OTHER PUBLICATIONS

Extended European Patent Office Search Report for Application No. 19165651.1-1013 dated Aug. 5, 2019 (8 pages).

*Primary Examiner* — Ruth Ilan
*Assistant Examiner* — Marlon A Arce
(74) *Attorney, Agent, or Firm* — Michael Best & Friedrich LLP

(57) ABSTRACT

A bicycle comprises front and rear wheels, a frame, a seat post, and a damping member. An upper portion of the seat post is movable relative to the frame between a first position and a second position. The damping member couples the seat post to the frame to dampen movement of the upper portion of the seat post. The damping member can be positioned at least partially in a top tube of the frame. Preferably, the seat post flexes when the upper portion of the seat post moves. The frame further includes a securing location for securing the seat post, and the securing location is a distance from the upper end of the seat tube that is at least 30% of a length of a seat tube. The seat post has a front-to-rear width, and the seat tube has a rear wall spaced from the seat post by a gap that is at least 25% of a front-to-rear width of the seat post.

20 Claims, 6 Drawing Sheets

(56) References Cited

U.S. PATENT DOCUMENTS

| | | | |
|---|---|---|---|
| 9,789,925 B2 | 10/2017 | Lund et al. | |
| 9,828,054 B2 | 11/2017 | D'Aluisio et al. | |
| 10,086,899 B2 | 10/2018 | Hartung et al. | |
| 10,150,530 B2 | 12/2018 | Lund et al. | |
| 10,328,991 B2 | 6/2019 | Lund et al. | |
| 10,351,192 B2 | 7/2019 | Hartung et al. | |
| 2006/0119069 A1* | 6/2006 | D'Aluisio | B62K 21/02 280/279 |
| 2009/0065316 A1* | 3/2009 | Chen | B62K 25/08 188/322.14 |
| 2011/0248470 A1* | 10/2011 | Chubbuck | B62K 19/36 280/283 |
| 2012/0061941 A1 | 3/2012 | Choi et al. | |
| 2014/0110979 A1* | 4/2014 | Barkley | B62J 1/065 1/65 |
| 2015/0321719 A1 | 11/2015 | Schmidt et al. | |
| 2016/0244114 A1 | 8/2016 | D'Aluisio et al. | |
| 2016/0332687 A1* | 11/2016 | Hartung | B62K 19/18 |
| 2016/0339985 A1 | 11/2016 | Lund et al. | |
| 2019/0002050 A1* | 1/2019 | Shipman | B62J 1/08 |
| 2019/0047649 A1* | 2/2019 | Chiesa | B62J 1/06 |
| 2019/0071146 A1* | 3/2019 | Shirai | B62K 23/06 |
| 2019/0077484 A1 | 3/2019 | Lund et al. | |
| 2019/0106171 A1* | 4/2019 | Eberlberger | B62J 1/00 |

FOREIGN PATENT DOCUMENTS

| | | |
|---|---|---|
| EP | 3246236 A1 | 11/2017 |
| EP | 3301004 B1 | 12/2018 |
| EP | 3265372 B1 | 8/2019 |
| EP | 3265373 B1 | 8/2019 |
| FR | 2718703 A1 | 10/1995 |

\* cited by examiner

BICYCLE WITH COMPLIANT SEAT POST INTERFACE

BACKGROUND

The present invention relates generally to bicycles and specifically to bicycle frames having features for reducing the amount of road shock transmitted to the rider.

Bicycles designed for paved roads commonly have a rigidly mounted rear wheel, which is light weight and provides rear end stiffness that is desired by most serious road cyclists. In some riding conditions, such as when riding long distances or over rough roads, it would be desirable to reduce the amount of shock or vibration transmitted from the road to the rider. One way to accomplish this is to make the rear end of the bicycle compliant, which facilitates absorbing of the shock and vibration. However, such attempts to make the rear end of a road bike compliant have commonly resulted in an increase in weight or loss of rear end lateral stiffness, both of which are undesired.

SUMMARY

The present invention provides a bicycle comprising front and rear wheels, a frame supported on the front and rear wheels, a seat post supported by the frame, and a damping member. An upper portion of the seat post is movable relative to the frame between a static first position and a stressed second position. The damping member (e.g., a hydraulic damper) couples the seat post to the frame to dampen movement of the upper portion of the seat post between the first and second positions. A collar can be used to secure the damping member to the seat post. The damping member can be positioned at least partially in a tube of the frame, such as the top tube. Preferably, a lower portion of the seat post is substantially rigidly secured to the frame, and the seat post flexes when the upper portion of the seat post moves from the first position to the second position.

In one embodiment, the frame includes a seat tube having a length between a crank axis and an upper end of the seat tube, and the frame further includes a securing location for securing the seat post. In this embodiment, the securing location can be a distance from the upper end that is at least 30% (preferably at least 45% and more preferably at least 55%) of the length of the seat tube.

In another embodiment, the seat post has a front-to-rear width, and the frame includes a seat tube having a rear wall spaced from the seat post by a gap that is at least 25% (preferably at least 35% and more preferably at least 45%) of the front-to-rear width of the seat post.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
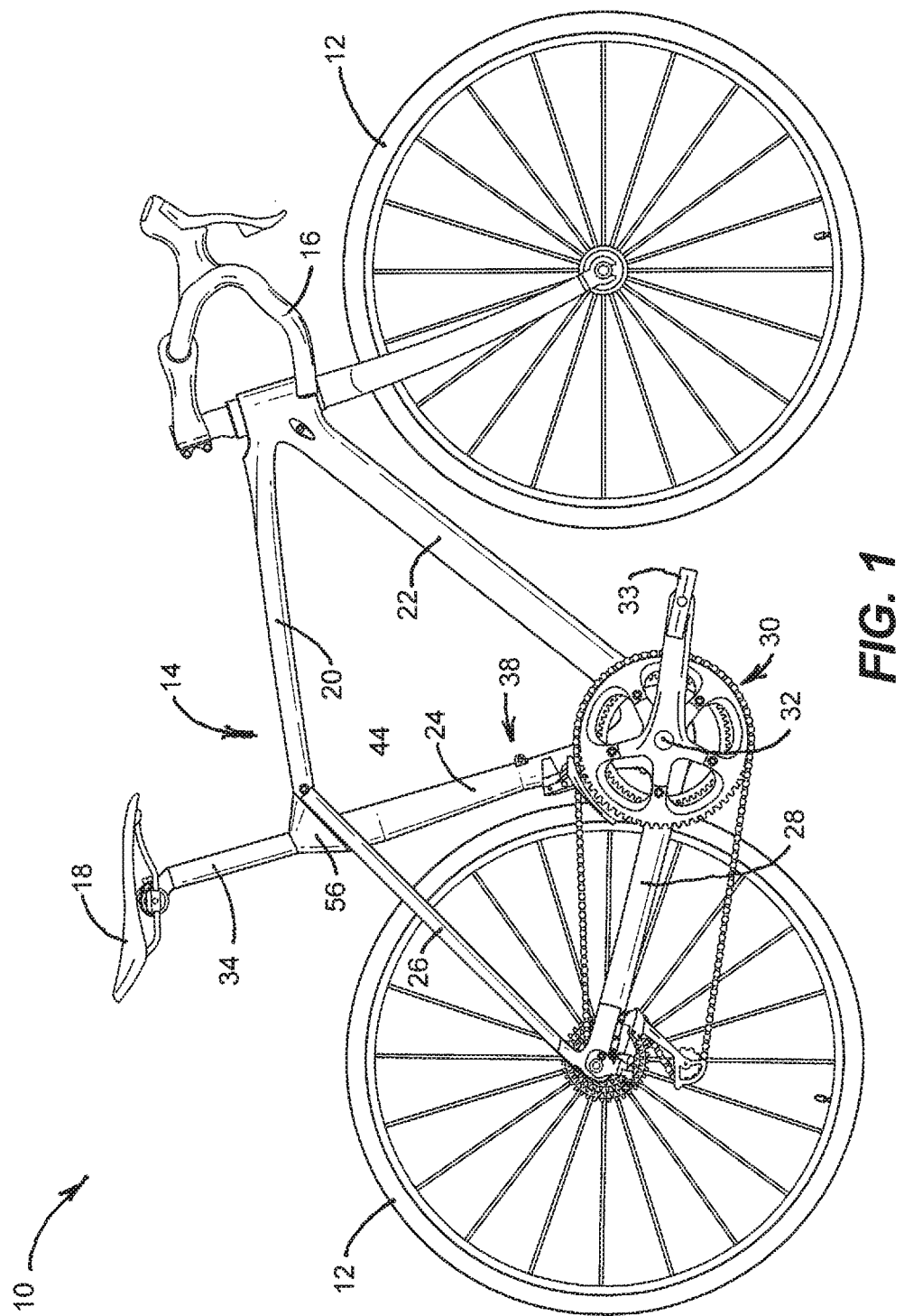
FIG. 1 is a side view of a bicycle embodying the present invention.
Figure 2:
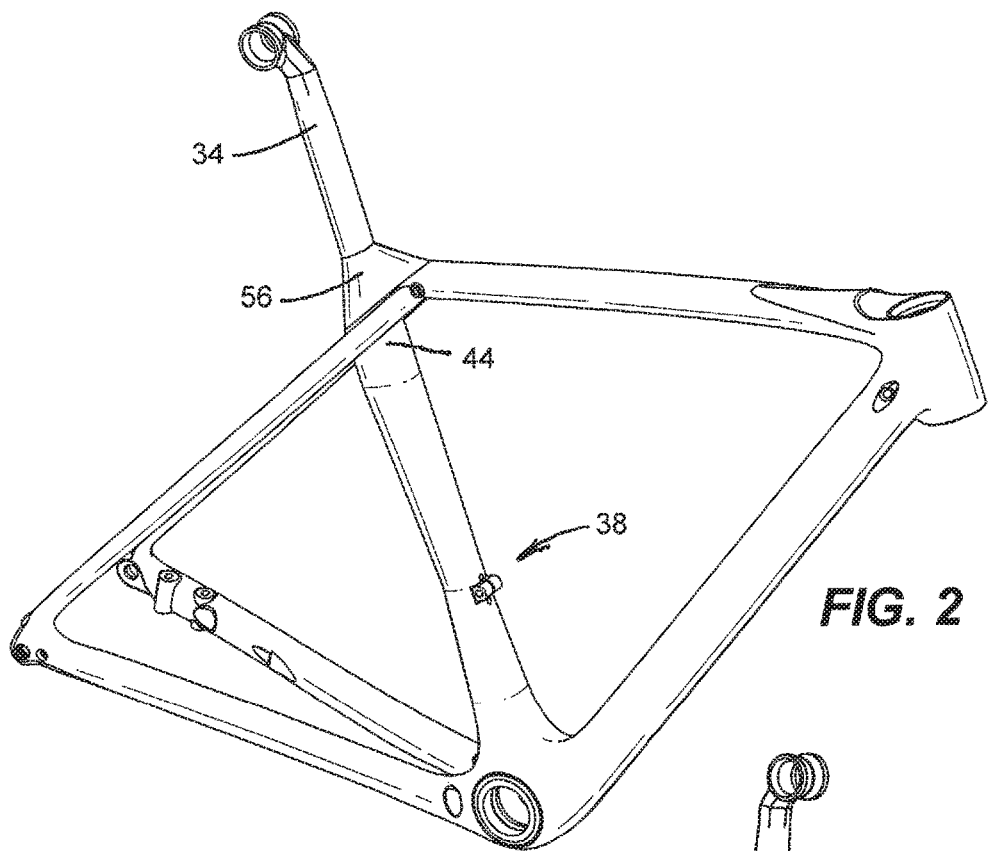
FIG. 2 is a front perspective view of a frame and seat post assembly from the bicycle of FIG. 1.
Figure 3:
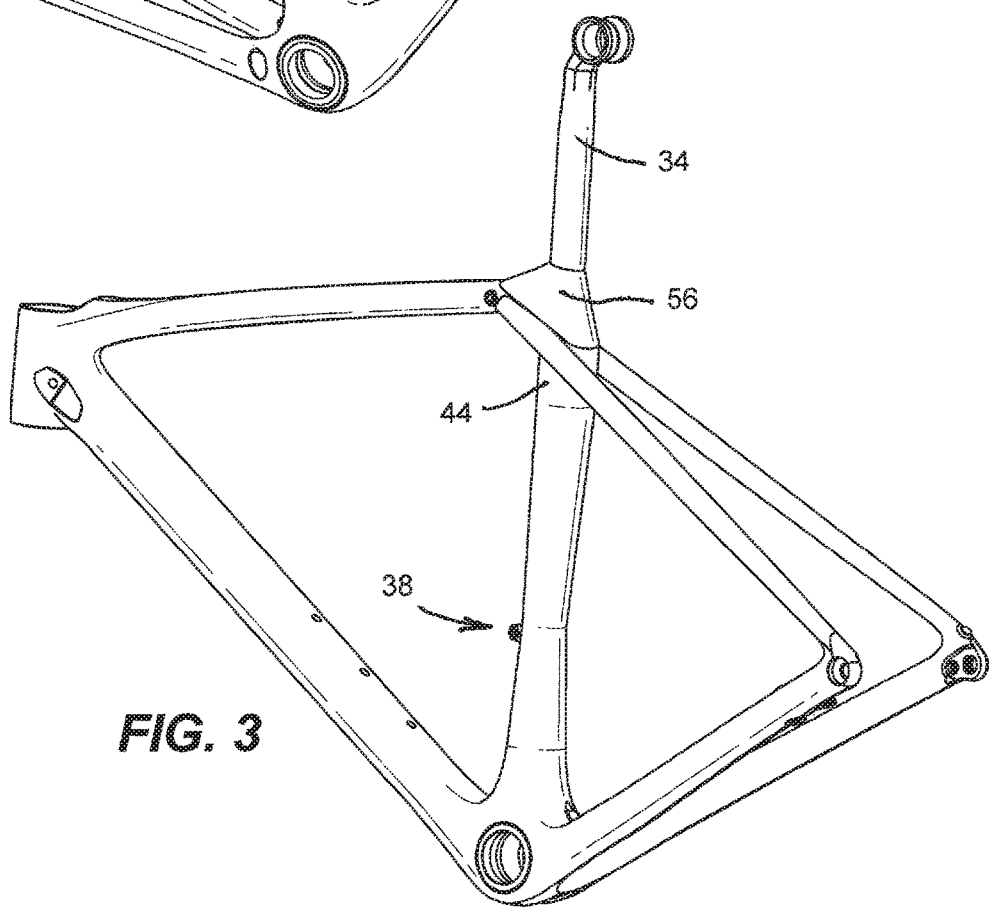
FIG. 3 is a rear perspective view of the frame and seat post assembly of FIG. 2.
Figure 4:
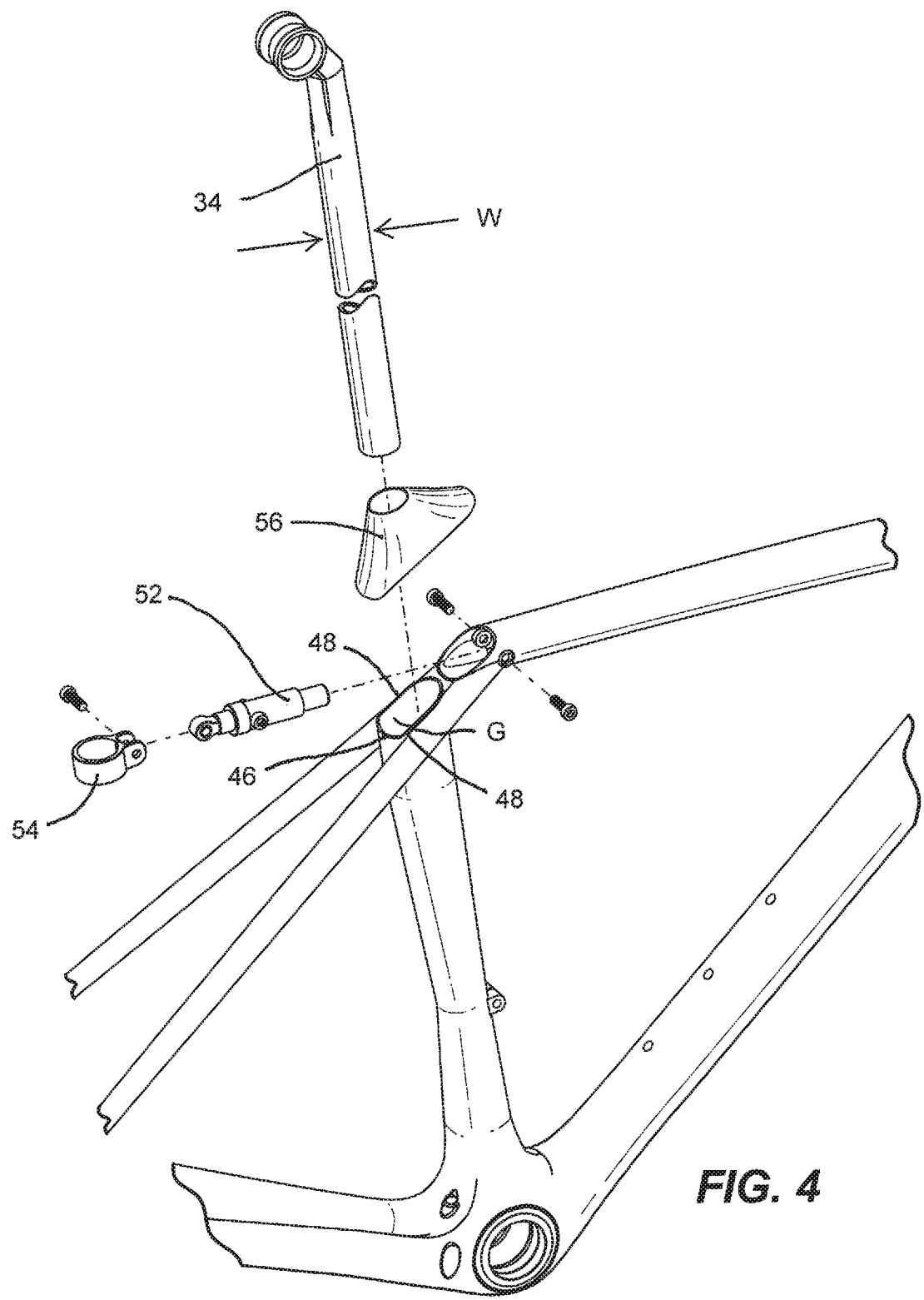
FIG. 4 is an enlarged exploded view of the frame and seat post assembly of FIG. 3.

FIG. 1 illustrates a bicycle 10 having two wheels 12, a frame 14 supported on the wheels 12, handlebars 16 for steering the bicycle 10, and a seat 18 for supporting the rider. The illustrated frame 14 includes a top tube 20, a down tube 22, a seat tube 24, two chainstays 26, and two seatstays 28, as is known in the art. A crankset 30 defines a crank axis 32 and supports two pedals 33. A seat post 34 is partially positioned inside the seat tube 24 and protrudes upwardly from the seat tube 24 to support the seat 18.

Referring to FIGS. 2-6, the seat post 34 is secured to the seat tube 24 by clamping at a clamping location 38 spaced from the upper end 36 of the seat tube 24 by a distance D that is about 60% of the length L of the seat tube (measured from the top of the seat tube to the crank axis 32). For example, for a frame having a seat tube length L of 560 mm, the distance D would be about 336 mm. The upper end 36 of the seat tube 24 includes a flared portion 44 that defines a gap G between a rear wall 46 of the flared portion 44 and the seat post 34. The illustrated gap is about 50% of the front/rear width W of the seat post 34. For example, for a seat post having a width of 27.2 mm, the gap would be about 13.6 mm. The opposing side walls 48 and front wall 50 of the flared portion 44 are substantially parallel to each other and define a much smaller gap between the walls 48,50 and the seat post 34.

Figure 5:
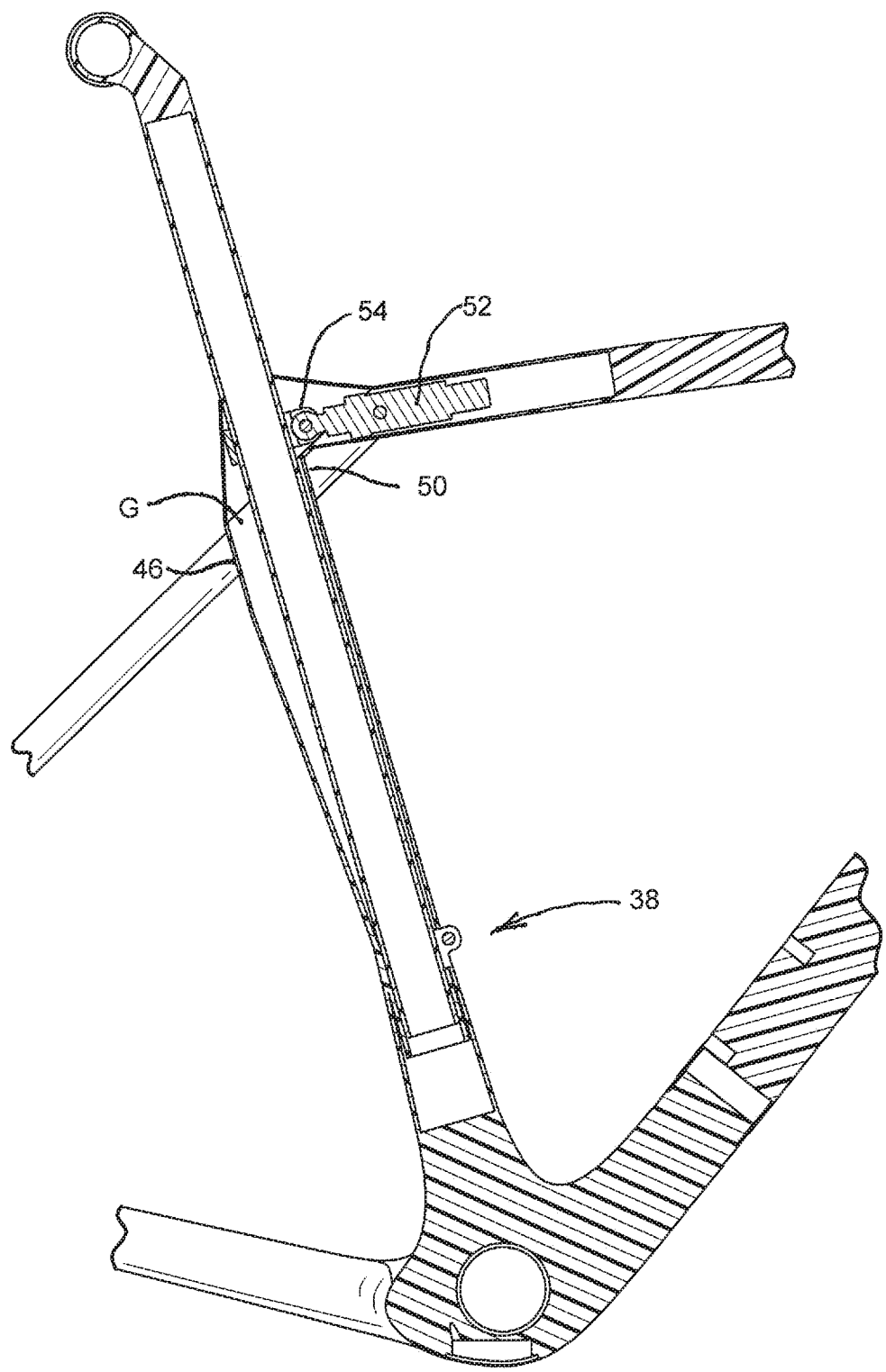
FIG. 5 is a section view of the frame and seat post assembly taken along line 5-5 in FIG. 2 with the seat post in an unflexed position.
Figure 6:
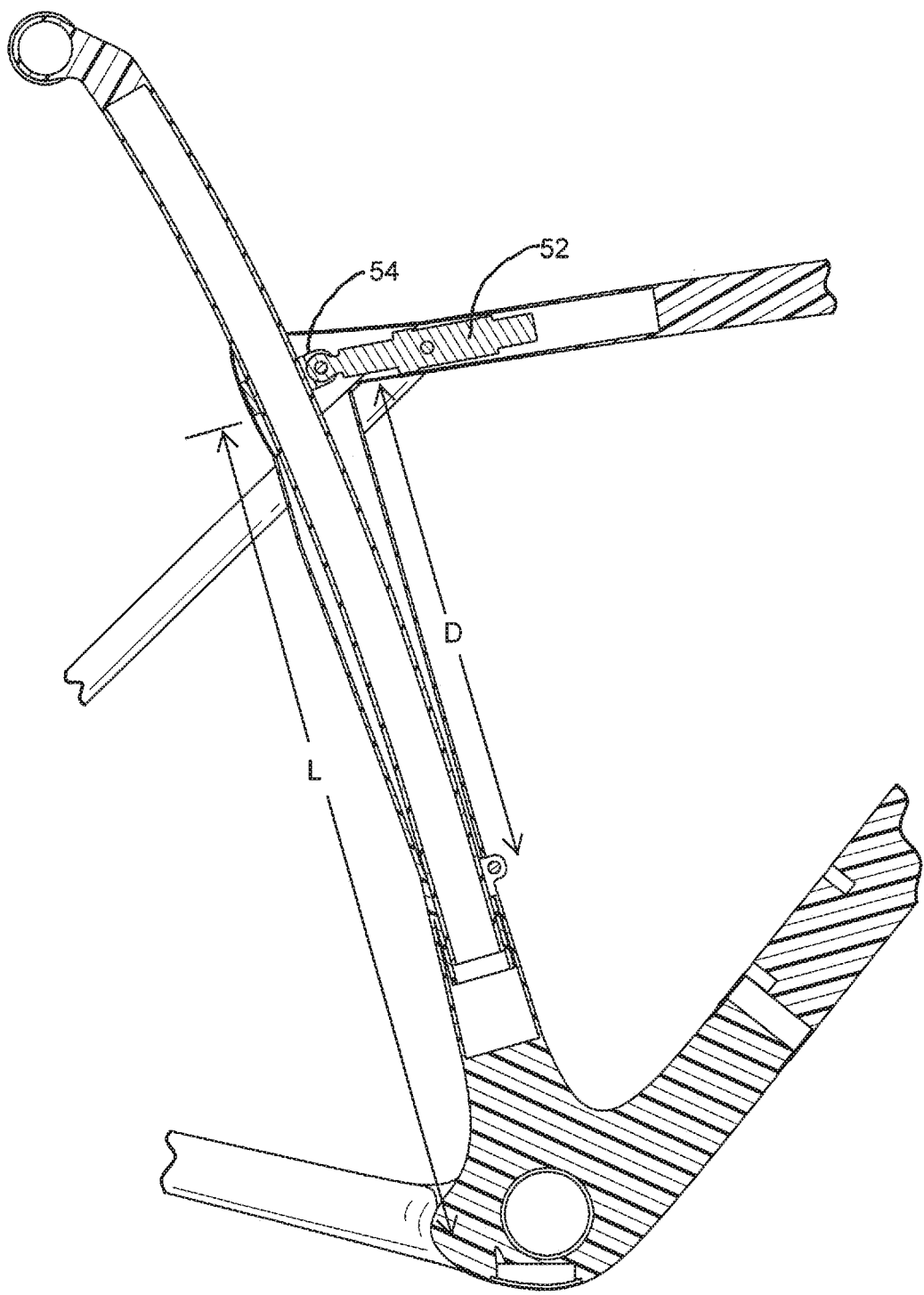
FIG. 6 is the section view of FIG. 5 with the seat post in a flexed position.

By virtue of the above-described flared portion 44 and gap G, the upper end of the seat post 34 can move (e.g., flex) rearwardly and downwardly to facilitate the absorption of shock and vibration travelling from the rear wheel 12 and through the seatstays 28. The rearward and downward flexing of the seat post is best shown in FIG. 5-6. It should be appreciated that instead of flexing the seat post could be designed to pivot or hinge relative to the frame. In such an embodiment, a biasing member would need to be used to bias the seat post toward the raised or unstressed position.

The illustrated arrangement further includes a damping member 52 operatively positioned between the seat post 34 and the frame 14. More specifically, the damping member 52 is secured between the top tube 20 and a collar 54 secured to the seat post 34, and is chosen to dampen movement of the seat post 34 between the unflexed and flexed positions. The illustrated damping member 52 is an oil-filled through shaft damper with a low speed rebound adjuster. It has bushings at each end of the outer tube so it can take side load from the seat post and it has a clevis mounting. Due to the close fit of the end bushings, the damper provides lateral stability to the seat post.

The illustrated arrangement further includes a resilient boot 56 positioned to cover the top opening of the seat tube 24, and particularly the gap G between the seat post 34 and the flared portion 44 of the seat tube 24. The boot 54 is made from a suitable elastomeric material, such as silicone. The boot 54 substantially fills the space between the seat post and the upper end of the seat tube 24, thereby prevent intrusion of unwanted substances, such as water or dirt.

It is envisioned that different riders might want different stiffnesses for the seat post (e.g., due to rider weight, riding style, or other preference). In this regard, the present invention allows the seat post to be customized to the rider's preference by changing the material, thickness, shape, or other relevant characteristic to achieve a seat post with the desired dynamic performance. In addition, in an alternative embodiment, the gap G between the seat post 34 and the flared portion 44 could be filled with a resilient bushing (not shown) to provide extra support to the seat post and resistance to flexing. In this embodiment, in the event that a rider perceives that the seat post 34 is flexing too little or too much, the bushing can be replaced with a softer or stiffer bushing to achieve the desired amount of flexing of the seat post 34.

Figure 7:
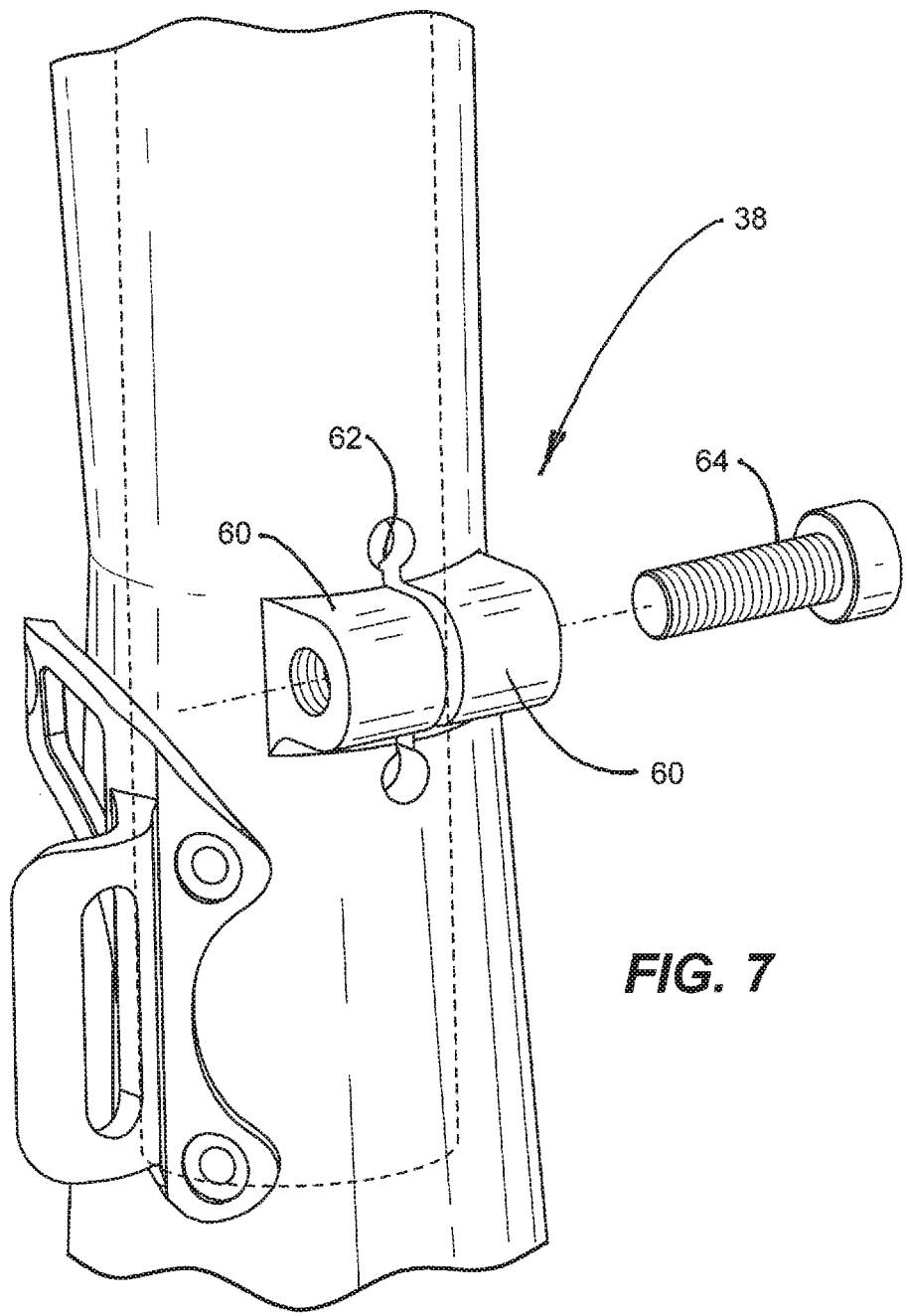
FIG. 7 is an enlarged view of a seat post binder clamp from the bicycle of FIG. 1.

Referring to FIG. 7, clamping the seat post 34 to the seat tube 24 is accomplished with a binder clamp including two ears 60 on opposing sides of a slot 62 in the seat tube 24. A fastener 64 can be inserted through one of the ears and threaded into the other to provide binding force to clamp the lower end of the seat post 34.

Various features and advantages of the invention are set forth in the following claims.

The invention claimed is:
1. A bicycle comprising:
a front wheel and a rear wheel;
a frame supported on the front wheel and the rear wheel;
a seat post supported by the frame, an upper portion of the seat post being movable relative to the frame between a static first position and a stressed second position, wherein a lower portion of the seat post is substantially rigidly secured to the frame, wherein the seat post flexes when the upper portion of the seat post moves from the static first position to the stressed second position; and
a damping member coupling the seat post to the frame to dampen movement of the upper portion of the seat post between the static first position and the stressed second position, wherein the damping member comprises a hydraulic damper.

2. A bicycle as claimed in claim 1, wherein the frame includes a crank axis and a seat tube having an upper end, wherein the seat tube has a length between the crank axis and the upper end, wherein the frame further includes a securing location for securing the seat post, and wherein the securing location is a distance from the upper end that is at least 30% of the length of the seat tube.

3. A bicycle as claimed in claim 2, wherein the distance from the upper end is at least 45% of the length of the seat tube.

4. A bicycle as claimed in claim 1, wherein the damping member includes a collar secured to the seat post.

5. A bicycle as claimed in claim 1, wherein the damping member is positioned at least partially in a tube of the frame.

6. A bicycle as claimed in claim 1, wherein the frame includes a top tube, and wherein the damping member is positioned at least partially in the top tube.

7. A bicycle as claimed in claim 1, wherein the seat post has a front-to-rear width, and wherein the frame includes a seat tube having a rear wall spaced from the seat post by a gap that is at least 25% of the front-to-rear width of the seat post.

8. A bicycle as claimed in claim 7, wherein the gap is at least 35% of the front-to-rear width of the seat post.

9. A bicycle comprising:
a front wheel and a rear wheel;
a frame supported on the front wheel and the rear wheel, the frame including a crank axis and a seat tube having an upper end, wherein the seat tube has a length between the crank axis and the upper end; and
a seat post supported by the frame, an upper portion of the seat post being movable relative to the frame between a static first position and a stressed second position;
wherein the frame further includes a securing location for securing a lower portion of the seat post, and wherein the securing location is a distance from the upper end that is at least 30% of the length of the seat tube;
wherein the bicycle further comprises a damping member coupling the seat post to the frame to dampen movement of the upper portion of the seat post between the static first position and the stressed second position, wherein the damping member comprises a hydraulic damper.

10. A bicycle as claimed in claim 9, wherein the damping member is positioned at least partially in a tube of the frame.

11. A bicycle as claimed in claim 9, wherein the distance from the upper end is at least 45% of the length of the seat tube.

12. A bicycle as claimed in claim 9, wherein the distance from the upper end is at least 55% of the length of the seat tube.

13. A bicycle as claimed in claim 9, wherein the lower portion of the seat post is substantially rigidly secured to the frame at the securing location.

14. A bicycle as claimed in claim 9, wherein the damping member includes a collar secured to the seat post.

15. A bicycle as claimed in claim 9, wherein the frame includes a top tube, and wherein the damping member is positioned at least partially in the top tube.

16. The bicycle as claimed in claim 9, wherein the securing location is located along the seat tube, and is closer to the crank axis than to the upper end of the seat tube.

17. A bicycle comprising:
a front wheel and a rear wheel;
a frame supported on the front wheel and the rear wheel, the frame including a seat tube and a top tube, wherein the seat tube defines a first internal cavity and the top tube defines a second internal cavity;
a seat post supported by the frame and extending partially into the first internal cavity of the seat tube, an upper portion of the seat post being movable relative to the seat tube between a static first position and a stressed second position, wherein a lower portion of the seat post is substantially rigidly secured to the seat tube, wherein the seat post flexes when the upper portion of the seat post moves from the static first position to the stressed second position; and
a damping member coupling the seat post to the frame to dampen movement of the upper portion of the seat post between the static first position and the stressed second position, wherein a portion of the damping member extends into the second internal cavity.

18. The bicycle of claim 17, wherein the damping member is coupled directly to the top tube with at least one fastener.

19. A bicycle comprising:
a front wheel and a rear wheel;
a frame supported on the front wheel and the rear wheel, the frame including a crank axis and a seat tube having an upper end, wherein the seat tube has a length between the crank axis and the upper end; and a seat post supported by the frame, an upper portion of the seat post being movable relative to the frame between a static first position and a stressed second position;

wherein the frame further includes a securing location for securing a lower portion of the seat post, and wherein the securing location is a distance from the upper end that is at least 30% of the length of the seat tube;

wherein the bicycle further comprises a damping member coupling the seat post to the frame to dampen movement of the upper portion of the seat post between the static first position and the stressed second position, and wherein the damping member is positioned at least partially in a tube of the frame.

20. The bicycle of claim 19, wherein the tube is a top tube of the frame.

* * * * *